April 2, 1940.  J. O. THIBAULT  2,195,801
ELECTRIC MOTOR
Filed June 22, 1937   3 Sheets-Sheet 1
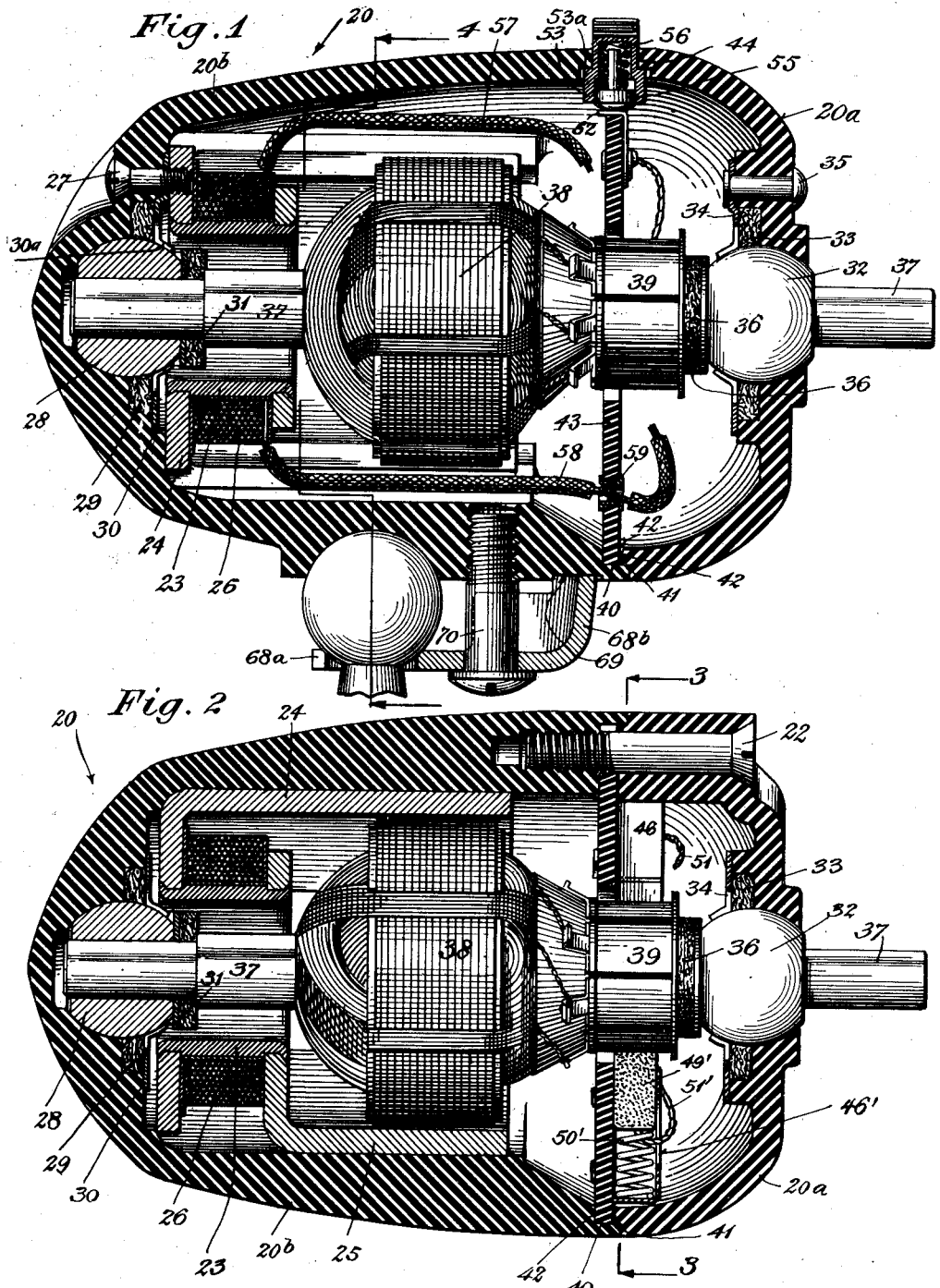
INVENTOR
Joseph O. Thibault,
BY
ATTORNEY April 2, 1940.  J. O. THIBAULT  2,195,801
ELECTRIC MOTOR
Filed June 22, 1937   3 Sheets-Sheet 2
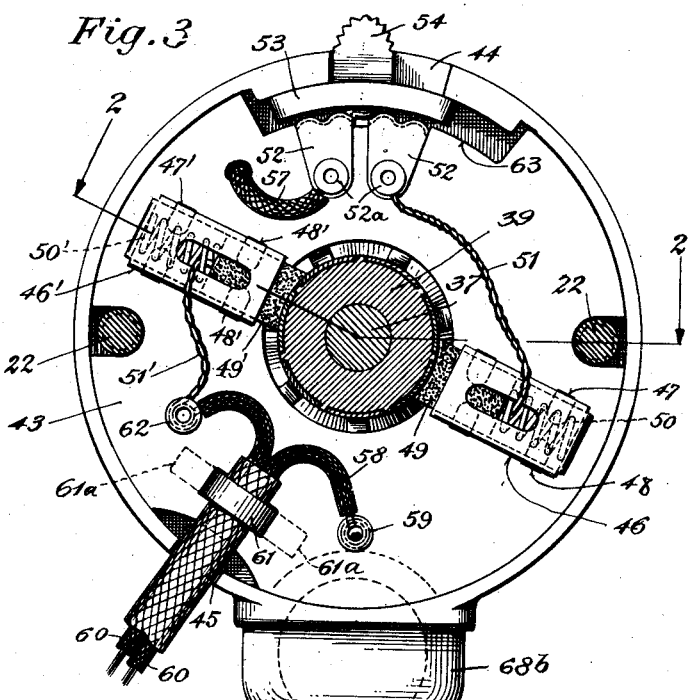
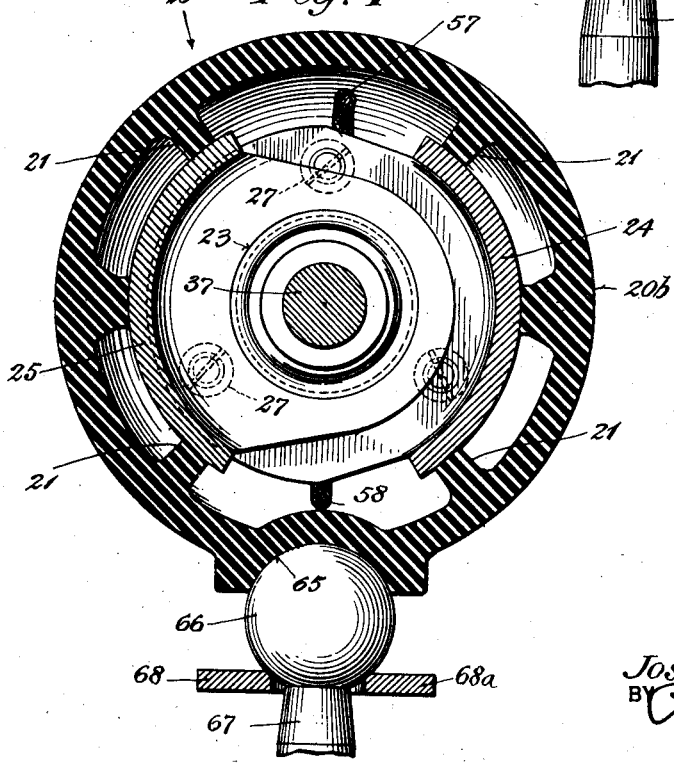
INVENTOR
Joseph O. Thibault,
BY
ATTORNEY April 2, 1940.　　　J. O. THIBAULT　　　2,195,801
ELECTRIC MOTOR
Filed June 22, 1937　　　3 Sheets-Sheet 3

INVENTOR
Joseph O. Thibault,
BY
ATTORNEY

Patented Apr. 2, 1940

2,195,801

UNITED STATES PATENT OFFICE 2,195,801

ELECTRIC MOTOR

Joseph O. Thibault, Bridgeport, Conn., assignor to Casco Products Corporation, Bridgeport, Conn., a corporation of Connecticut Application June 22, 1937, Serial No. 149,556

17 Claims. (Cl. 172—36)

This invention relates to electric motors and more particularly to fan motors.

It is desired in constructing fan motors to make them small, durable, compact and efficient and at the same time possess the power of motors of larger overall size. When motors of large overall size are used in connection with the operation of a fan, they partially block air from the blades and because of the irregular shapes of the motors also cause eddy currents which diminish the efficiency of the fan.

In the device of the present invention the motor has been made small in diameter and made streamlined in shape, which, because of its smooth outline, will substantially avoid the presence of any eddy currents. The casing is generally ovate with respect to its longitudinal axis and presents no obstructions to the flow of air to fan blades. The small diameter of the motor, which is a result of positioning the field coil and yoke axially of the armature so that only the pole pieces extend along the armature, tends to minimize the blocking effect of the casing on the air flow.

In order to make the casing more rigid and durable, the device of the present invention provides a plurality of spaced ribs positioned longitudinally of the casing. These ribs are molded internally of the casing so as not to obstruct air flow to the fan blades. The pole pieces are inserted in the casing so as to contact the inner faces of the ribs to give added rigidity to the casing.

Another feature of the invention which facilitates assembly and repair of the motor is the separation of the casing adjacent the commutator of the armature to provide a removable cap and the positioning of a plate of insulating material extending transversely of the casing between the two sections of the casing, and clamping it therebetween. This plate has removably mounted on its face the holders for the brushes of the motor. One edge of the plate is cut out and contains contacts which cooperate with a switch mounted to move in the direction of the line of jointure in an aperture formed between the two sections. The switch is held in place only by the edges of the sections and is automatically released when the sections are separated. The insulating plate also has provision for locking the supply wires thereto which supply wires are brought into the casing through apertures formed in the line of jointure between the two sections of the casing and also means for connecting the field coil leads. When the cap is removed, the plate is released and all of the electrical connections which require attention are simultaneously made available.

The device of the present invention uses the ribs positioned on the internal surface of the casing to not only reinforce the casing but to also provide channels in which the field coil leads may be positioned so as to be free from the danger of being caught in the rapidly whirling armature. This danger is increased in a small motor of the present type because its reduced diameter requires the parts to be placed as close together as possible.

The device of the present invention also provides for a novel clamping arrangement by providing in a pad on the base of the casing a hemispherical recess by which it is adapted to be mounted on a ball-mounting and a clamp which is adapted to be bolted to the casing and locked under the ball-mounting to hold the motor thereon.

The brush holders of the present invention have tangs projecting from the back surfaces thereof and these tangs are inserted through the plate of insulating material previously described and bent over to releasably lock the holder in position on the plate. When it is desired to renew these elements, the tangs are bent up and the holders are removed.

Other features and advantages will hereinafter appear.

In the drawings:

Figure 1 is a vertical section of the motor casing.

Fig. 2 is a sectional view of the motor casing taken along lines 2—2 of Fig. 3.

Fig. 3 is a section of the motor taken along line 3—3 of Fig. 2 with the cap removed.

Fig. 4 is a section of the motor taken along lines 4—4 of Fig. 1.

Figure 6:
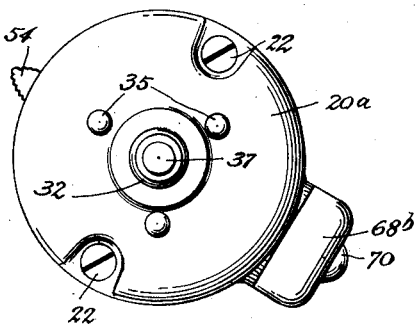
Fig. 6 is an end view of the motor, per se.

According to the present invention, a casing 20 having thin walls is molded from dielectric material and is generally ovate in shape. As shown in Fig. 1, the casing is closed at its rear end and has been streamlined so that it slopes off into a smooth end in order that there will be no vertical surfaces which would cause eddy currents in the air passing to the fan blades. The front end of the casing slopes off so as to be generally in line with a hub 19 carrying a plurality of fan blades 18.

The casing 20 is made in two sections 20a and

20b. The line of division is made adjacent the position occupied by the commutator of the motor when assembled for reasons to be later set forth. The section 20b carries the field structure for the motor and section 20a forms a removable cap. The two sections of the casing are clamped together by bolts 22 passing through the cap or section 20a and is threaded into section 20b. These bolts make it possible to readily separate the two sections.

The motor of the present invention is made small and compact so that it will not block the air flowing to the fan. The walls are made as thin as possible to reduce the size of the motor and in order to brace the thin shell of the motor casing so that it will stand the compressional strains placed upon it, spaced longitudinally-extending ribs 21 are molded integrally therewith. These ribs are positioned on the inside of the motor so as not to obstruct free passage of air over the smooth outer surface of the motor to the fan blades.

In order to obtain a motor having a small diameter, it has been found desirable to use a field construction similar to that shown in copending application S. N. 107,134, filed October 23, 1936, comprising a field structure 23 having a pair of longitudinally extending pole pieces 24 and 25 which extend along the casing member 20b. These pole pieces are very rigid and are placed in intimate contact with the inner surfaces of the ribs 21. When so positioned, they assist the ribs in resisting compressional strain placed upon the casing. A field coil 26 is positioned on the field structure 23 and the field structure is mounted in the back end of the casing and is locked thereto by a plurality of bolts 27 passing through the casing and threaded into pole piece 24 as shown in Fig. 1. It will be seen that the field structure having pole pieces of the present type requires a minimum amount of space in the direction of the diameter of the motor and in addition to strengthening the casing it permits the casing to be made much smaller.

Mounted in a recess in the back end of the casing 20b is a spherical bearing 28 having an oil-retaining washer 29 positioned adjacent thereto and held to the casing by a plate 30. The plate 30 is provided with a plurality of ears 30a which are positioned between the pole piece 24 and the casing and is held by the clamping action produced by the bolts 27 in locking the field structure to the casing. In the forward end or cap 20a of the casing a recess is formed in which is mounted a spherical bearing 32 having an oil-retaining washer 33 positioned adjacent thereto and held in position by a plate 34 riveted to the end of the casing as shown in Fig. 1 by a plurality of rivets 35.

An armature shaft 37 is positioned in the bearings 28 and 32 and extends through the cap 20a for the reception of the hub 19 carrying the blades 18 in the fan. Mounted on the shaft 37 adjacent the bearings are a pair of oil-retaining washers 31 and 36 which prevent any oil from the bearings working along the shaft due to the rotation of the same. The armature shaft carries a wire-wound armature 38 of the usual construction connected to a commutator 39.

Figure 5:
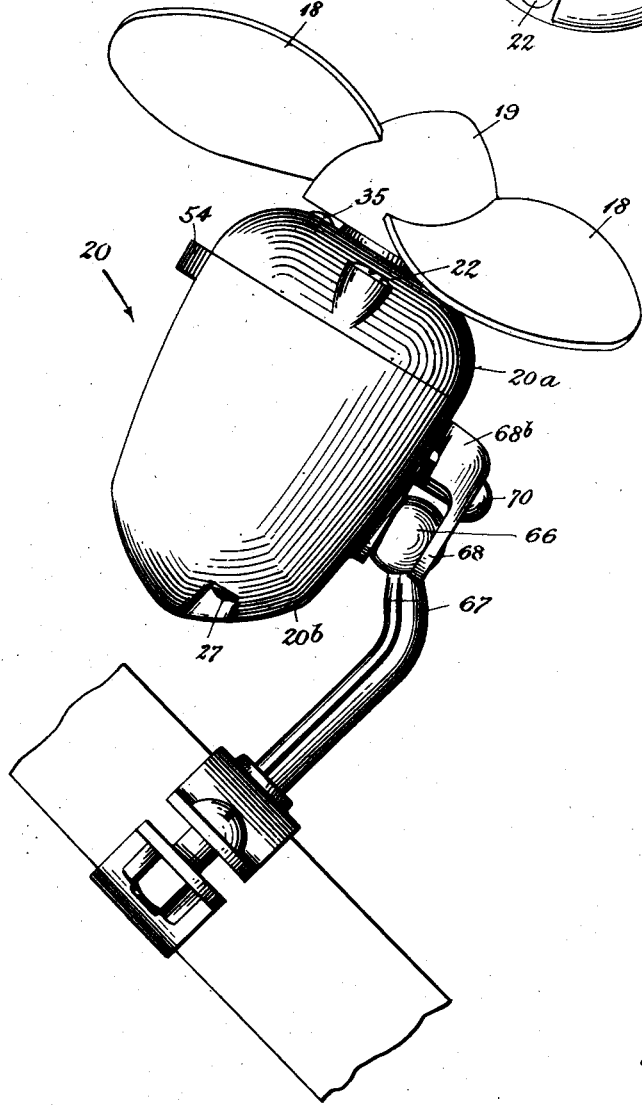
Fig. 5 is a side view of the motor as positioned on the supporting means.

The motor casing of the present invention is divided intermediate its ends, adjacent the commutator into sections 20a and 20b. The forward end of casing 20b is recessed as at 40. The end of the cap 20a has a shallow recess 41. When the two sections are bolted together, there is formed between them a channel 42. The cooperating surfaces of the sections as shown in Figs. 1, 2 and 5, form a smooth surface joint which will not hinder the free flow of air to the fan by providing obstructions.

A plate 43 of insulating material, such as paper base Bakelite, is formed with a central aperture adapted to fit over the commutator. The plate is positioned in the channel 42 so as to be clamped and held in position by the sections 20a and 20b when they are assembled. The plate has apertures 64 through which bolts 22 may pass to lock the sections together. Due to the fact that the line of division in the motor casing in the present invention is adjacent the commutator, the plate forms the means for mounting the commutator brushes, and also a means for mounting practically all of the electrical connections which are apt to give trouble in an electric motor and which connections are the most difficult to make when assembling the motor. It will be seen, therefore, that plate and all of the electrical connections are held in position by the casing when the motor is assembled and are made readily accessible when the cap is removed.

A pair of commutator brush holders 46, 46' are mounted on this plate. These brush holders are formed as a rectangular sheath of sheet metal and have pairs of tangs 47, 48, 47' and 48', projecting from the rear surfaces thereof. Apertures are preformed in the plate in a position to properly hold the brushes in operative relation with the commutator and the tangs are passed through the apertures and are bent over to lock the holder to the plate. It will be seen that whenever it is necessary to renew the brush holders all that is required is the straightening of the tangs and removing the brush holders from the plate.

The brush holders have mounted therein brushes 49, 49' which are pressed into engagement with the commutator by means of springs 50, 50'. Electrical connection is made to the brushes through a pair of leads 51, 51'. In order to reduce the length of the connecting leads for the brushes, the forward side of each of the brush holders has an aperture into which the leads 51, 51' may extend.

On one edge of the plate there is a cut-away portion 63. A pair of switch contacts 52 are mounted on this cutaway portion in spaced relation and have undulated contact surfaces, as shown in Fig. 3. These contacts are formed of a thin strip of metal, as shown in Fig. 1, and are bent over the edge of the plate and are locked to the plate by eyelets 52a.

A switch is provided for stopping and starting the motor. This switch is positioned in a rectangular aperture 44 formed along the line of jointure between the two sections of the casing. In operation, the switch is adapted to slide in aperture 44 in the direction of the line of jointure. The switch comprises a body 53 having a curvature which is the same as the casing so that it may slide thereon. A fingerpiece 54 extends from the center of the body and through the aperture 44 in the casing. The switch body and finger-piece have a bore formed in the underside thereof as shown in Fig. 1. A contact plunger 55 is mounted to slide in the bore and is spring-pressed outwardly by compression spring 56 into engagement with switch contacts 52. The switch body has shoulders 53a which engage shoulders on the edge of each casing member as shown in Fig. 1. The reaction of the spring pressing the contact plunger 55 against the contacts when the motor is assembled will press the shoulders 53a of the switch body against the casing to hold the same in position. Since no other means of holding the switch in position is provided, it is obvious that upon the removal of the cap 20a, the switch member is readily removed and disassembled. When the switch is in the position shown in Fig. 3, the contact plunger will extend into the depression formed between the contacts and will be held there so as to bridge the two contacts and close the circuit to operate the motor. However, when the switch is moved to the right, the contact plunger will open the circuit to the motor and will engage the depression in the undulated contact member and be held in open-circuit position.

An aperture 45 is formed in the lower part of the casing at the line of jointure and through which a pair of supply wires 60 for the motor are inserted. These wires are clamped to the plate of insulating material by a band 61 which extends around the wires and passes through apertures preformed in the plate. The ends 61a, 61b of the band are flattened against the plate, as shown in Fig. 3, to lock the same in engagement with the plate. This holds the supply cable and prevents any pull on the actual electrical connections of the motor.

In a motor of such small diameter, great danger is present because of the field coil leads being injured by coming in contact with the whirling armature. In the device of the present invention, the ribs formed on the internal surface of the motor are used to not only reinforce the casing but to also provide channels in which the field coil leads may be positioned. The leads extend from the field coil and are positioned in the channels. They are secured at their other ends to the plate of insulating material adjacent its periphery. In this manner, the leads are effectively held away from the rotating armature. The lead 57 passes through an aperture in the plate and is secured to one of the eyelets 52a holding one of the switch contacts. The other field lead 58 is secured to eyelet 59 in the plate.

The circuit for the motor may be traced as follows: One wire of the supply wire 60 is connected to an eyelet 62 extending through and locked to plate 43. The brush lead 51' is connected to the eyelet 62 at one end and at its other end to the brush 49'. A circuit is then established from brush 49' through the armature to brush 49. Brush 49 is connected to one end of the brush lead 51. The other end of brush lead 51 is attached to the eyelet 52a holding one of the switch contacts 52. Field wire 57 is connected to the other contact 52 and connects the circuit to the field coil. Field lead 58 connects the other side of the field coil to eyelet 59 positioned in the plate and to which eyelet the other wire of supply wire 60 is attached.

From the above detailed description it will be seen that by removing cap 20a immediate access may be had to the commutator, brushes, switch, switch contacts, field lead connections, and supply wire connections so that any of them can be renewed or repaired.

In order to mount the motor of the present invention for universal movement, the base of the casing is provided with a pad having a hemispherical recess 65 which is adapted to receive a ball-mounting 66 of a supporting device 67. An L-shaped clamp 68 is mounted with an end 68b in a slight recess 69 formed in the casing. The other end 68a is adapted to extend out into cooperative relation with the recess to grip the opposite surface of the ball-mounting. A bolt 70 passes through the clamp and is threaded into the casing in order to tighten the clamp about the ball-mounting and lock the casing to the same. The end 68a of the clamp which is adapted to engage the ball-mounting is formed with a forked portion so that the same may be readily passed into operative relation with the ball-mounting. In Fig. 5 the motor is shown as being mounted on a steering column but it is pointed out that it can be used with any desired supporting means.

Variations and modifications may be made within the scope of this invention and portions of the improvements may be used without others.

I claim:

1. In an electric fan motor, a hollow casing of moldable dielectric material, said casing being provided with a plurality of spaced, longitudinally-extending, internal ribs; a rigid magnetic field structure slidably mounted in the casing and secured to the end wall thereof and contacting the inner surfaces of the ribs to assist the ribs in reinforcing the casing against compressional strains; a field coil carried by the field structure; bearings in opposite ends of the casing; and an armature mounted in the bearings to cooperate with the field structure.

2. In an electric fan motor, a hollow casing of moldable dielectric material, said casing being provided with a plurality of spaced, longitudinally-extending, internal ribs and being divided intermediate its ends to provide a removable cap; a rigid magnetic field structure slidably mounted in the casing and secured to the end wall opposite said cap and contacting the inner surfaces of the ribs to assist the ribs in reinforcing the casing against compressional strains; a field coil carried by the field structure; bearings in the opposite ends of the casing; and an armature mounted in the bearings to cooperate with the field structure.

3. In a streamlined electric motor, a hollow casing of generally ellipsoidal form having a plurality of longitudinally-extending, internal, reinforcing ribs; a rigid magnetic field structure slidably mounted in the casing and contacting the inner surfaces of the ribs to assist the ribs in reinforcing the casing against compressional strains; a field coil carried by the field structure; bearings in opposite ends of the casing; an armature mounted in the bearings to cooperate with the field structure; the casing being divided intermediate its ends adjacent the commutator of the armature so as to provide a removable cap therefor; and a terminal plate disposed between the cap and end of the casing and extending into the casing adjacent the commutator.

4. In a streamlined electric motor, a hollow casing of generally ellipsoidal form having a plurality of longitudinally-extending, internal, reinforcing ribs; a rigid magnetic field structure slidably mounted in the casing and contacting the inner surfaces of the ribs to assist the ribs in reinforcing the casing against compressional strains; a field coil carried by the field structure; bearings in opposite ends of the casing; an armature mounted in the bearings to cooperate with the field structure; the casing being divided intermediate its ends adjacent the commutator of the armature so as to provide a removable cap therefor; a plate of insulating material clamped between the two portions of the casing;

and brush holders having brushes therein mounted on the plate.

5. In a streamlined electric motor, a hollow casing of generally ellipsoidal form having a plurality of longitudinally-extending, internal, reinforcing ribs; a rigid magnetic field structure slidably mounted in the casing and contacting the inner surfaces of the ribs to assist the ribs in reinforcing the casing against compressional strains; a field coil carried by the field structure; bearings in the opposite ends of the casing; an armature mounted in the bearings to cooperate with the field structure; the casing being divided intermediate its ends adjacent the commutator of the armature so as to provide a removable cap therefor; and a switch mounted between the two portions of the casing to slide along the line of jointure.

6. In an electric motor, a hollow casing; a magnetic field structure mounted in the casing; a field coil carried by the field structure; bearings in the opposite ends of the casing; an armature mounted in the bearings to cooperate with the field structure; the casing being divided intermediate its ends adjacent the commutator of the armature so as to provide a removable cap therefor; a switch mounted between the two sections of the casing to slide in an aperture extending along the line of jointure, said switch comprising a body portion having shoulders engaging the edges of the sections of the casing; a fingerpiece extending from the body portion and outwardly from the casing; and a spring-pressed plunger mounted in the body and tending to hold the shoulders in contact with the edges of the casing.

7. In an electric motor, a hollow casing; a magnetic field structure mounted in the casing; a field coil carried by the field structure; bearings in the opposite ends of the casing; an armature mounted in the bearings to cooperate with the field structure; the casing being divided intermediate its ends adjacent the commutator of the armature so as to provide a removable cap therefor; a switch mounted between the two sections of the casing to slide in an aperture extending along the line of jointure, said switch having a spring-pressed plunger mounted therein; a plate of insulating material clamped between the two sections of the casing; and contacts carried by the plate and cooperating with the spring-pressed plunger of the switch.

8. In an electric motor, a hollow casing; a magnetic field structure mounted in the casing; a field coil carried by the field structure; bearings in the opposite ends of the casing; an armature mounted in the bearings to cooperate with the field structure; the casing being divided intermediate its ends adjacent the commutator of the armature so as to provide a removable cap therefor; a switch mounted between the two sections of the casing to slide in an aperture extending along the line of jointure, said switch having a spring-pressed plunger mounted therein; a plate of insulating material clamped between the two sections of the casing; and contacts carried by the plate and cooperating with the spring-pressed plunger of the switch, the contacts being constructed and arranged to hold the switch in either open or closed-circuit position.

9. In an electric motor, a hollow casing; a magnetic field structure mounted in the casing; a field coil carried by the field structure; bearings in the opposite ends of the casing; an armature mounted in the bearings to cooperate with the field structure; the casing being divided intermediate its ends adjacent the commutator of the armature so as to provide a removable cap therefor; a plate of insulating material mounted so as to be clamped between the two sections of the casing; a plurality of brush holders having tangs thereon adapted to be inserted through the plate to lock the holders thereto; and brushes mounted in the holders.

10. In an electric motor, a hollow casing; a rigid magnetic field structure mounted in the casing; a field coil carried by the field structure; bearings in opposite ends of the casing; an armature mounted in the bearings to cooperate with the field structure; the casing being divided intermediate its ends adjacent the commutator of the armature so as to provide a removable cap therefor; a plate of insulating material mounted so as to be clamped between the two sections of the casing; a plurality of brush holders mounted on the plate; brushes mounted in the holders; the brush holders having an aperture in one side thereof through which the brush lead is inserted.

11. In an electric fan motor, a hollow casing having a plurality of longitudinally-extending, internal, reinforcing ribs; a rigid magnetic field structure slidably mounted in the casing and contacting the inner surface of the ribs to assist the ribs in reinforcing the casing against compressional strain, a field coil carried by the structure and having leads connecting thereto and positioned between the internal ribs of the casing; bearings in the opposite ends of the casing; an armature mounted in the bearings to cooperate with the field structure; the casing being divided intermediate its ends and adjacent the commutator of the armature to provide a removable cap therefor; a plate of insulating material clamped between the two portions of the casing; and means on the plate for connecting the field leads thereto.

12. In an electric motor, a hollow casing; a magnetic field structure mounted in the casing; a field coil carried by the field structure; bearings in the opposite ends of the casing; an armature mounted in the bearings to cooperate with the field structure; the casing being divided intermediate its ends adjacent the commutator of the armature so as to provide a removable cap therefor; a plate of insulating material extending transversely of the casing and clamped between the two sections of the same, said plate having mounted thereon a pair of switch contacts; a plurality of brush holders with brushes mounted therein; a supply wire for the motor; and contacts for connecting the field coil leads; all of said elements being insulated from one another.

13. In an electric motor, a hollow casing; a magnetic field structure mounted in the casing; a field coil carried by the field structure; bearings in the opposite ends of the casing; an armature mounted in the bearings to cooperate with the field structure; the casing being divided intermediate its ends adjacent the commutator of the armature so as to provide a removable cap therefor; a plate of insulating material clamped between the two sections of the casing, the line of jointure between the two sections of the casing being formed with an aperture through which the supply wires may be inserted into the motor casing; and means for clamping the wires to the insulating panel.

14. In an electric motor, a hollow casing; a magnetic field structure mounted in the casing;

a field coil carried by the field structure; bearings in the opposite ends of the casing; an armature mounted in the bearings to cooperate with the field structure; the casing being divided intermediate its ends adjacent the commutator of the armature so as to provide a removable cap therefor; a switch mounted between the two sections of the casing to slide in an aperture extending along the line of jointure, said switch having a spring-pressed plunger mounted therein; a plate of insulating material clamped between the two sections of the casing; contacts carried by the plate and cooperating with the spring-pressed plunger of the switch; a plurality of brush holders secured to the plate and having brushes therein; the removal of the cap giving simultaneous access to both the switch and the brushes of the motor.

15. In an electric motor, a hollow casing; a magnetic field structure mounted in the casing; a field coil carried by the field structure; bearings in the opposite ends of the casing; an armature mounted in the bearings to cooperate with the field structure; the casing being divided intermediate its ends adjacent the ends of the commutator so as to provide a removable cap therefor; a plate of insulating material extending transversely of the casing and clamped between the two sections of the casing; said plate having mounted thereon a pair of switch contacts, a plurality of brush holders, a supply wire for the motor and contacts for connecting the field coil leads; the removal of the cap giving simultaneous access to all of the elements carried by the plate.

16. In an electric motor, a casing divided intermediate its ends to form a pair of sections, the end of one of the sections being recessed; a plate of insulating material disposed in the recessed end of the section and provided with openings therein; and means for securing the sections together, said means passing through at least some of the openings in the plate of insulating material.

17. In an electric motor, a casing divided intermediate its ends to form a pair of sections, the end of one of the sections being recessed; a plate of insulating material disposed in the recessed end of the section and provided with openings therein; and a bolt positioned in one of the sections with its head exposed and having the other end threaded into the other section, said bolt passing through an opening in the plate of insulating material.

JOSEPH O. THIBAULT.